US012751578B2

(12) United States Patent
Cingolani et al.

(10) Patent No.: US 12,751,578 B2
(45) Date of Patent: Oct. 6, 2026

(54) COFFEE GRINDER WITH LOAD CELL SUPPORT SYSTEM

(71) Applicant: SIMONELLI GROUP S.P.A., Belforte del Chienti (IT)

(72) Inventors: Claudio Cingolani, Camerino (IT); Mauro Parrini, Porto Sant'elpidio (IT); Marco Feliziani, Tolentino (IT)

( * ) Notice: Subject to any disclaimer, the term of this patent is extended or adjusted under 35 U.S.C. 154(b) by 303 days.

(21) Appl. No.: 18/589,698

(22) Filed: Feb. 28, 2024

(65) Prior Publication Data

US 2024/0298846 A1 Sep. 12, 2024

(30) Foreign Application Priority Data

Mar. 8, 2023 (IT) ........................ 102023000004272

(51) Int. Cl.

| | |
|---|---|
| ***A47J 42/56*** | (2006.01) |
| ***A47J 42/38*** | (2006.01) |
| ***A47J 42/40*** | (2006.01) |
| ***A47J 42/46*** | (2006.01) |
| ***A47J 42/50*** | (2006.01) |
| ***G01G 21/23*** | (2006.01) |

(52) U.S. Cl.

CPC ............... *A47J 42/56* (2013.01); *A47J 42/46* (2013.01); *A47J 42/50* (2013.01)

(58) Field of Classification Search

CPC .. A47J 42/56; A47J 42/46; A47J 42/50; A47J 42/40; A47J 42/38

See application file for complete search history.

(56) References Cited

U.S. PATENT DOCUMENTS

| | | | | |
|---|---|---|---|---|
| 2016/0143481 A1* | 5/2016 | Merelli | A47J 42/44 241/34 |
| 2016/0374513 A1* | 12/2016 | Rego | A47J 31/42 99/280 |
| 2022/0000314 A1* | 1/2022 | Pachi | A47J 42/40 |

FOREIGN PATENT DOCUMENTS

| | | | |
|---|---|---|---|
| CN | 113056221 A | 6/2021 |
| CN | 110691540 B | 10/2022 |
| EP | 3023041 A1 | 5/2016 |
| EP | 3424379 A1 | 1/2019 |
| IT | 202100005489 A1 | 9/2022 |

OTHER PUBLICATIONS

Search Report for Italian Priority Application No. 102023000004272, dated Oct. 18, 2023. [English discussion of cited prior art provided].

* cited by examiner

*Primary Examiner* — Mohammed S. Alawadi

(74) *Attorney, Agent, or Firm* — Egbert, McDaniel & Swartz, PLLC

(57) ABSTRACT

A coffee grinder includes a load cell fixed to a bracket for measuring the weight of coffee powder contained in the filter of a filter holder arranged in a seat of the bracket. The load cell has rear and front portions attached to the bracket, and a holder attached to a base, wherein the load cell is mounted on the support, so that the rear portion of the load cell is attached to the rear portion of the support, and the front portion of the load cell is spaced away from the front portion of the support to leave a gap between the front portion of the support and the front portion of the load cell. The width of the gap is such to allow for a downward bending of the front portion of the load cell that is lower than a maximum load limit of the load cell.

14 Claims, 16 Drawing Sheets

COFFEE GRINDER WITH LOAD CELL SUPPORT SYSTEM

CROSS-REFERENCE TO RELATED APPLICATIONS

Not applicable.

BACKGROUND OF THE INVENTION

The present invention relates to a coffee grinder equipped with a load cell to detect the weight of the ground coffee and with a support system suitable for preventing a damage to the load cell.

Coffee grinders defined as "on-demand coffee grinders" are known, which grind coffee directly on a coffee extraction filter without the use of a measuring device. On-demand coffee grinders are more and more used in the market because they always provide fresh coffee powder for extraction.

The traditional on-demand coffee grinders are timed, meaning that one or more doses of ground coffee can be selected by setting a grinding time. So, every time, the coffee grinder dispenses the amount of coffee relative to the operation time of the motor. However, such a system is not very accurate because the amount of coffee powder in grams that is being dispensed is not constant as it depends on the degree of grinding and on the temperatures of the grinding unit of the machine.

In order to solve such a drawback, a weighing system of the ground coffee is known, which can weigh the coffee powder directly inside the filter of the filter holder in order to have a constant dose of coffee in grams and thus a more consistent quality of the liquid coffee extracted by the coffee machine.

Such a weighing system generally uses a load cell as described in EP3023041A1 on behalf of the same applicant.

FIG. 1 shows a coffee grinder according to the prior art, which is indicated with reference numeral 100.

The coffee grinder (100) comprises a base (1) whereon a frame (2) is mounted. A grinding unit (20) driven by an electric motor (21) is arranged inside the frame (2).

A hopper (22) ending into the grinding unit (20) is mounted on the frame (2). Coffee beans are contained in the hopper (22).

The frame (2) supports a slide-shaped dispenser (23) in communication with the grinding unit (20) for dispensing the coffee powder.

The base (1) has a front partition (10) wherein a bracket (3) is movably mounted, said bracket (3) having a seat (30), generally in the shape of a fork, which is suitable for supporting a filter holder (4), so that the filter (40) of the filter holder is disposed under the dispenser (23) to receive the coffee powder.

The bracket (3) is connected to a load cell (5) to measure the weight of the coffee powder contained in the filter holder disposed in the seat (30) of the bracket.

The load cell (5) has a rear portion (50) and a front portion (51). The rear portion (50) of the load cell is attached to the base (1) by means of rear screw means (V1).

As shown in FIG. 1A, the front portion (51) of the load cell is fixed to the bracket (3) by means of front screw means (V2), in such a way that a gap (G) is provided between the base (1) and the front portion (51) of the load cell, said front portion (51) of the load cell being suitable for bending downwards in the gap (G) to measure the weight of the coffee fed into the filter (40) of the filter holder supported by the bracket (3).

The load cell (5) has a very high accuracy, usually to the tenth of a gram, in order to ensure consistency in measuring the weight of a dose of coffee powder. For such a purpose, load cells with a maximum load comprised in the range of 3 to 9 kg are generally used. It must be noted that a downward bending of the front portion (51) of the load cell of a few tenths of a millimeter, e.g. in the range of 0 to 0.5 mm, is sufficient to reach the maximum load of the load cell.

However, by operating the filter holder (4) quickly to obtain the dose of the ground coffee, the user may accidentally and energetically hit the seat (30) of the bracket, thus causing a downward bending of the front portion (51) of the load cell that is higher than the maximum load of the load cell, thus damaging the load cell. On the other hand, it must be considered that the base (1) generally consists in a thin sheet metal or plate that can get deformed and is not suitable for acting as stop to adequately stop a downward travel of the front portion (51) of the load cell.

Additionally, during the transportation of the coffee grinder (100) with the bracket (3) fixed to the load cell (5), the bracket (3) may vibrate due to impacts, thus causing a pressure in the front portion (51) of the load cell that is higher than the maximum load of the load cell, and damaging the load cell.

Moreover, the load cell (5) may get damaged if the seat (30) of the bracket is pushed upwards, thus bending the front portion (51) of the load cell upwards.

EP3424379A1 discloses a coffee grinder according to preamble of claim 1. Such a coffee grinder comprises a hopper for coffee beans, a grinding chamber, and a doser for ground coffee. The doser is floating and rests on a load cell that measures the weight of the empty doser and the weight of the coffee doses that enter a first or second chamber of the doser, allowing the weighed dose of coffee to be immediately delivered into a filter holder.

SUMMARY OF THE INVENTION

The purpose of the present invention is to eliminate the drawbacks of the prior art by providing a coffee grinder with a load cell support system suitable for preventing damaging the load cell.

Another purpose is to provide such a coffee grinder equipped with a load cell support system that is reliable and easy to install and use.

Another purpose is to provide such a coffee grinder equipped with a safety system that can be combined with the support system to lock the load cell in position during transportation to prevent damage to the load cell.

These purposes are achieved in accordance with the invention with the features of the appended independent claim 1.

Advantageous achievements of the invention appear from the dependent claims.

The coffee grinder equipped with a load cell support system according to the invention is defined in the independent claim 1.

In order to prevent damaging the load cell due to impacts on the bracket that are higher than the maximum weight compatible with the load cell, the applicant devised a load cell support having a front portion suitable for limiting a downward bending of the front portion of the load cell. In such a way, with a single piece, which consists in the support, it is possible to firmly secure the load cell to the base and create a solid stop for the front portion of the load cell with the front portion of the support in order to prevent an excessive deformation of the load cell that would result in breaking the load cell. Being a single body, such a support ensures a perfect alignment of the load cell, keeping the measurement error of the load cell fixed and minimal at all times.

The coffee grinder according to the invention further comprises a safety system that can be used during the transportation of the coffee grinder to prevent any movement of the load cell. Such a safety system comprises a tab of suitable thickness that is inserted between the front portion of the support and the front portion of the load cell during the transportation of the coffee grinder so as to keep the load cell in a non-bent position, preventing the deformation of the load cell due to vibrations and impacts on the bracket during transportation.

The safety system also comprises a safety screw that crosses the base, the support and the tab and is screwed into the front portion of the load cell to lock the front portion of the load cell during transportation.

When the coffee grinder is to be used, the safety screw is unscrewed and the tab is extracted so to provide the gap between the front portion of the support and the front wall of the load cell that is necessary for the front portion of the load cell to bend downward in order to weigh the ground coffee contained inside the filter holder.

Such a safety system allows for handling the coffee grinder without any risk of damage, keeping the load cell attached to its support and the bracket attached to the load cell. In order to use the coffee grinder after transportation, it is simply necessary to unscrew the safety screw and remove the tab.

BRIEF DESCRIPTION OF DRAWINGS

Additional features of the invention will appear clearer from the following detailed description, which refers to merely illustrative and therefore not limiting embodiments, illustrated in the accompanying drawings, wherein.

DETAILED DESCRIPTION OF THE INVENTION

Figure 1:
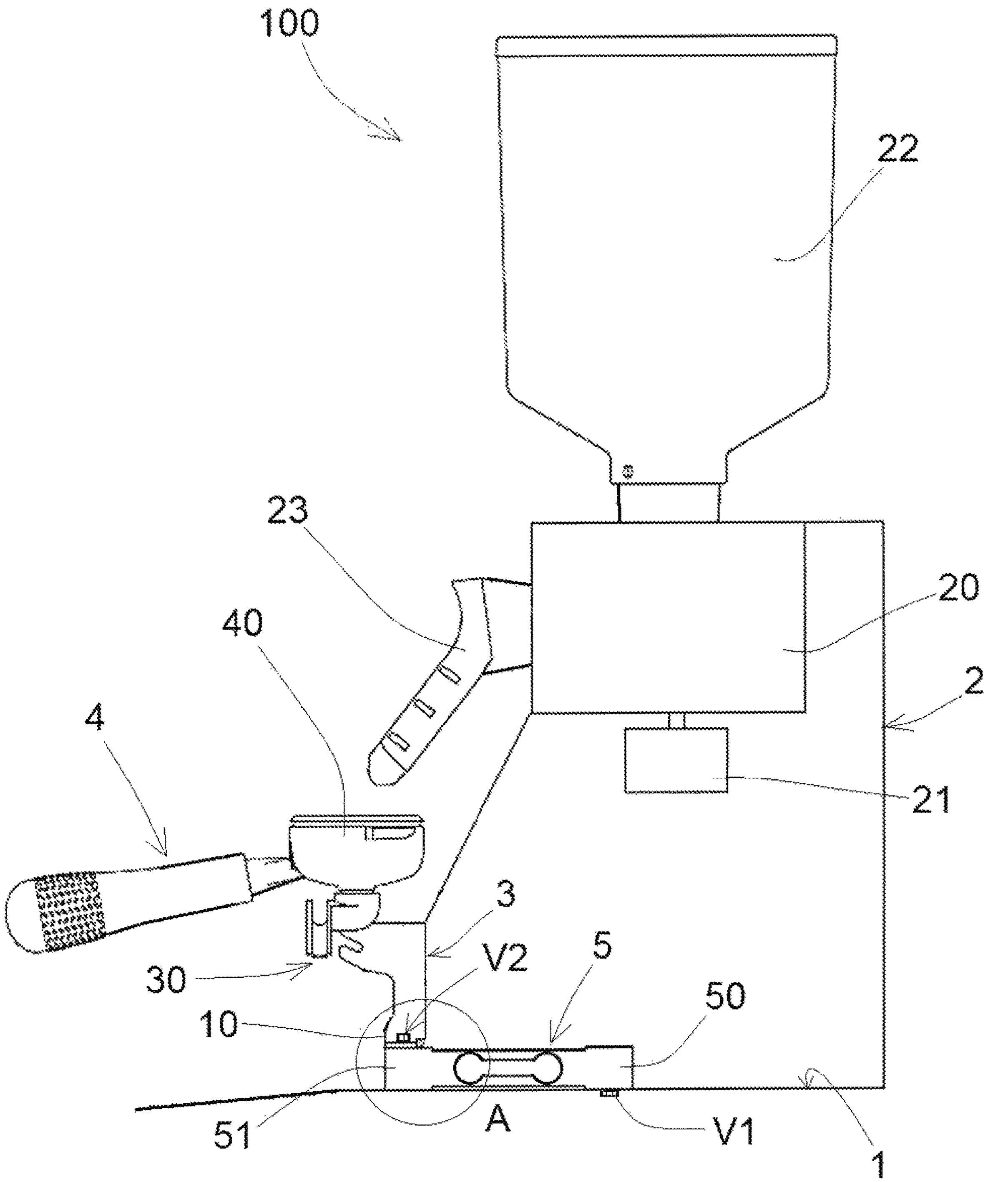
FIG. 1 PRIOR ART
FIG. 1 is a schematic side view of a coffee grinder according to the prior art.
Figure 1A:
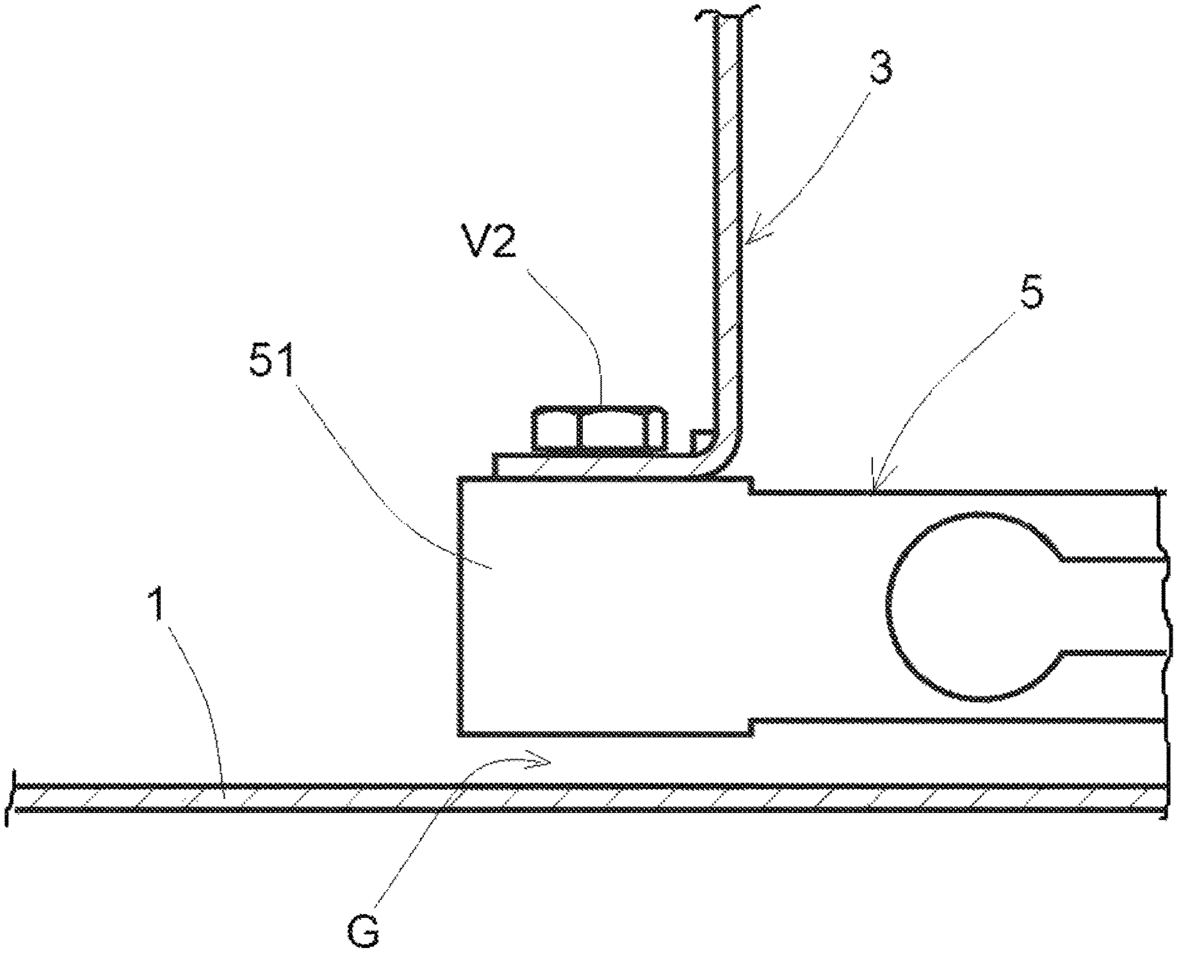
FIG. 1A is an enlargement of a detail enclosed in circle A of FIG. 1.

Hereafter, elements that are equal or corresponding to those already described are indicated with the same reference numerals, omitting their detailed description.

Figure 2:
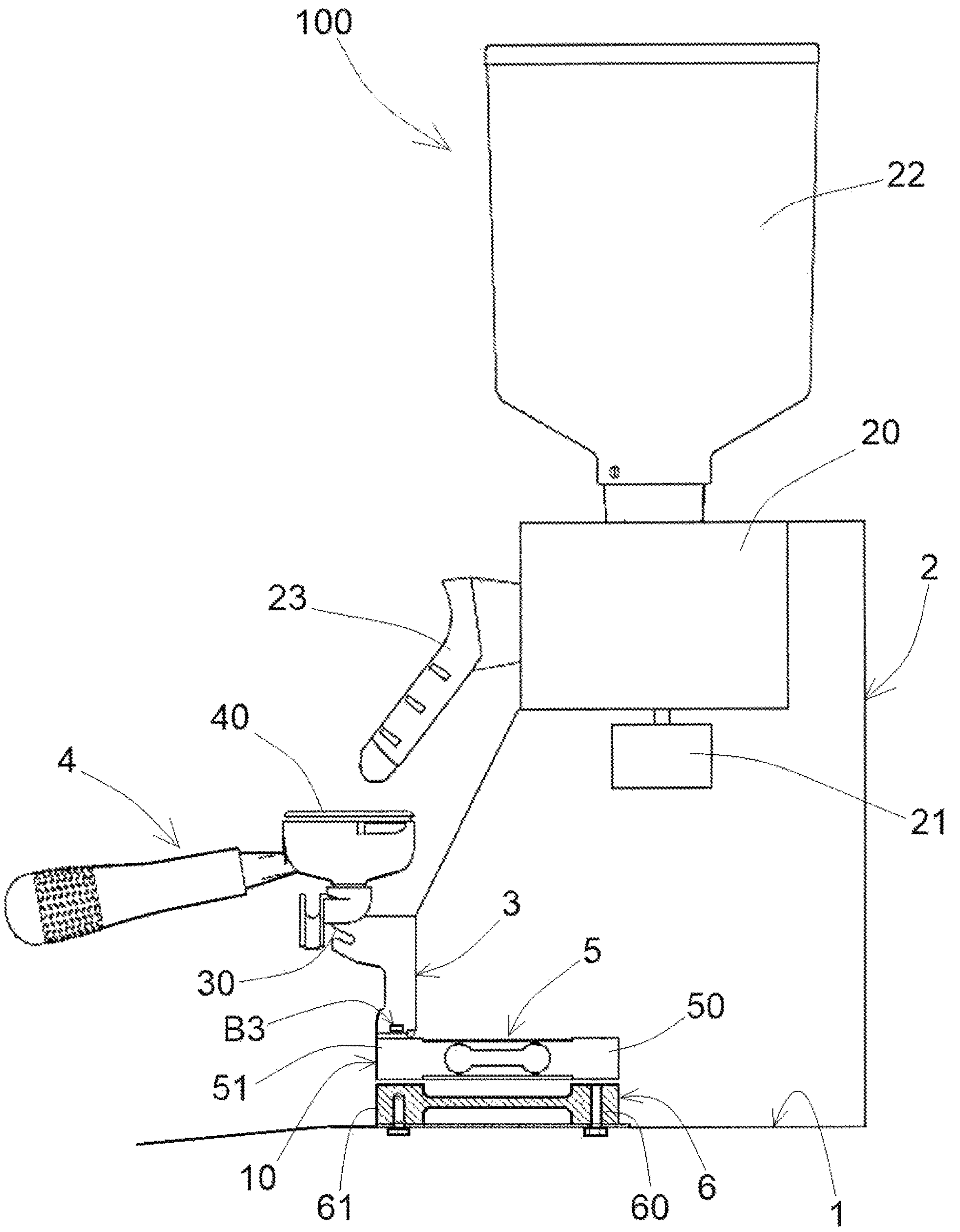
FIG. 2 is a schematic side view of a coffee grinder according to the invention.

With reference to FIG. 2, a coffee grinder according to the invention is illustrated, which is comprehensively indicated with reference numeral 100.

The coffee grinder (100) comprises a support (6) attached to the base (1). The load cell (5) is mounted on the support (6).

Figure 3:
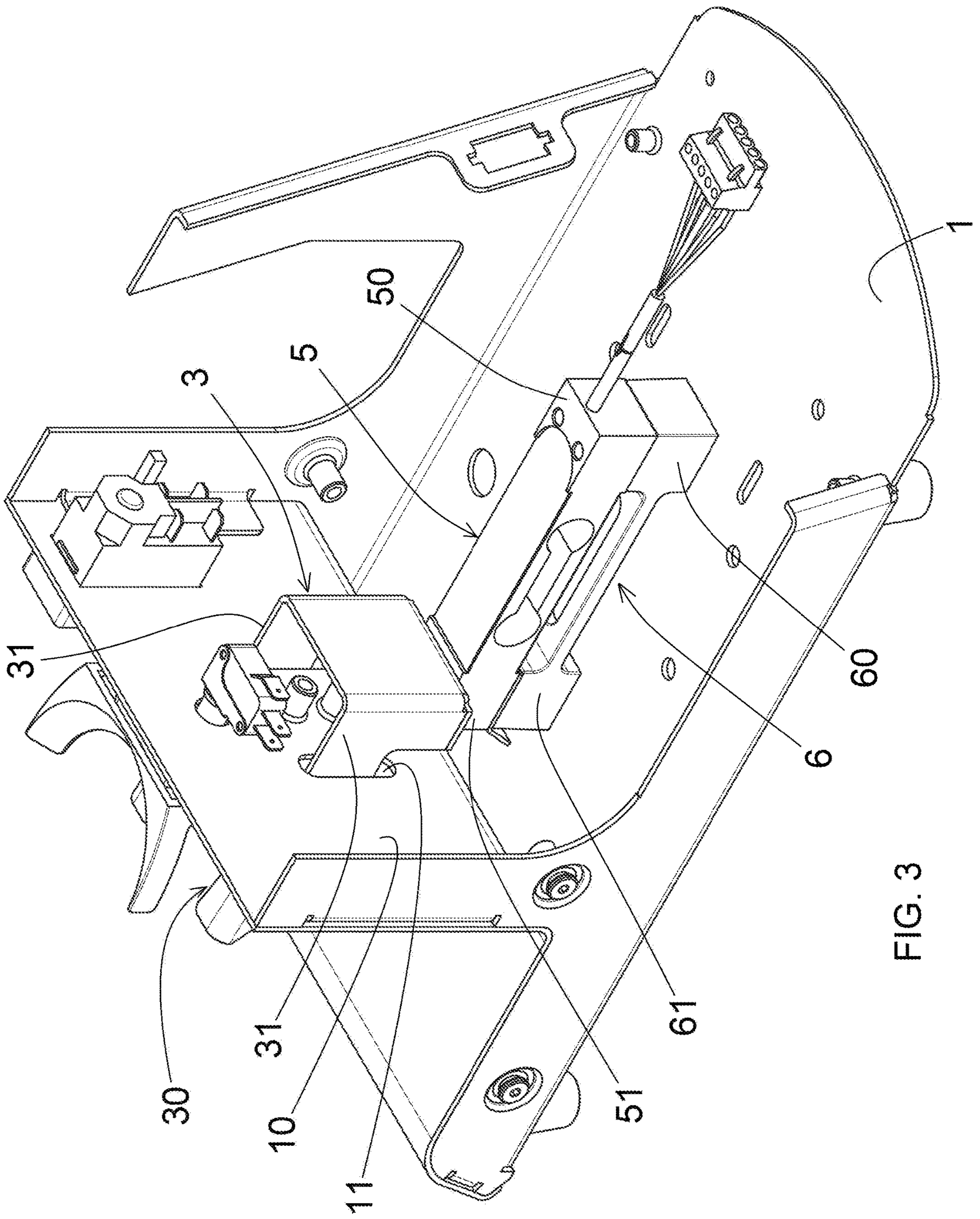
FIG. 3 is a perspective top view of a base of the coffee grinder according to the invention, illustrating a support that supports a load cell, shown in a safety configuration during the transportation of the coffee grinder.

Referring to FIG. 3, the load cell (5) has a parallelepiped shape with a length greater than a width and a height substantially equal to the width. Thus, the load cell (5) has a longitudinal axis extending in the direction of its length.

The support (6) has a length equal to the length of the load cell (5), a width equal to the width of the load cell, and a height substantially equal to the height of the load cell. Thus, the support (6) has a longitudinal axis that extends in the direction of its length. The height or thickness of the support is greater than the thickness of the base (1).

The support (6) has a longitudinal section in the shape of an "H." The support (6) has a rear portion (60) and a front portion (61).

The support (6) is attached to the base (1) so that the longitudinal axis of the support is disposed at a centerline of the base, and the front portion (61) of the support is close to the front partition (10) of the base.

The load cell (5) is mounted on the support (6) so that the rear portion (50) of the load cell is firmly secured to the rear portion (60) of the support, and the front portion (51) of the load cell is spaced away from the front portion (61) of the support so as to leave a gap (G) (see FIG. 13A) between the front portion (61) of the support and the front portion (51) of the load cell. For such a purpose, the front portion (61) of the support has a lower height than the height of the rear portion (60) of the support.

The width (i.e. vertical extension) of the gap (G) is such to allow for a downward bending of the front portion (51) of the load cell that is lower than a maximum load limit of the load cell. Thus, the front wall (61) of the support (6) acts as stop for a downward bending travel of the front portion (51) of the load cell.

Figure 4:
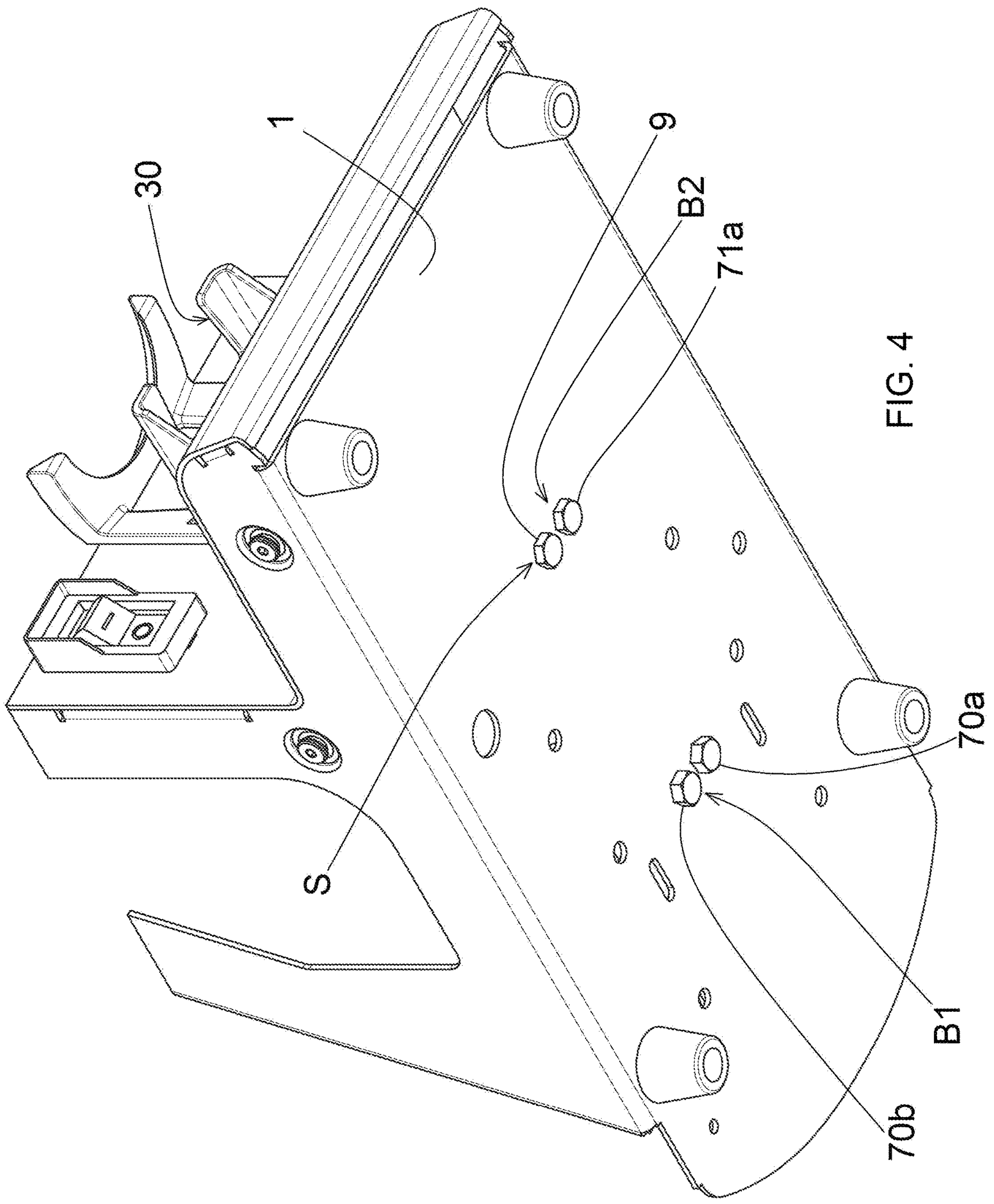
FIG. 4 is a perspective bottom view of the base of FIG. 3.
Figure 5:
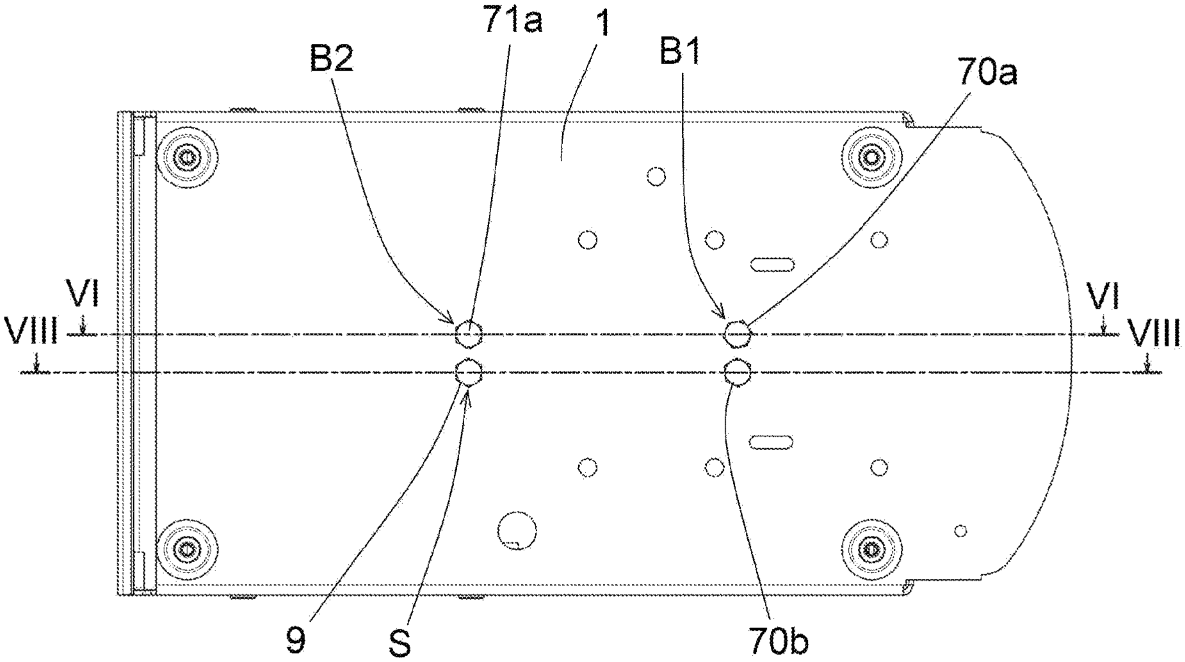
FIG. 5 is a bottom view of the base of FIG. 3.

Referring to FIGS. 4 and 5, first screw means (B1) secure the rear portion (60) of the support to the base (1) and the rear portion (50) of the load cell to the rear portion (60) of the support, and second screw means (B2) secure the front portion (61) of the support to the base (1). In view of the above, the support (6) is firmly fixed to the base (1) and the rear portion (50) of the load cell is fixed to the rear portion of the support so that the front portion (51) of the load cell can bend.

Figure 6:
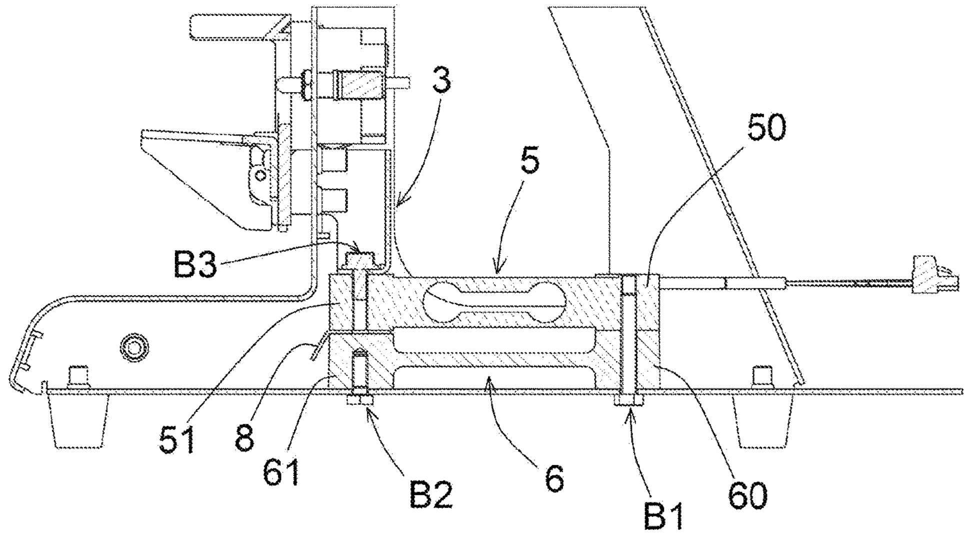
FIG. 6 is a sectional view taken along the plane VI-VI of FIG. 5.
Figure 8:
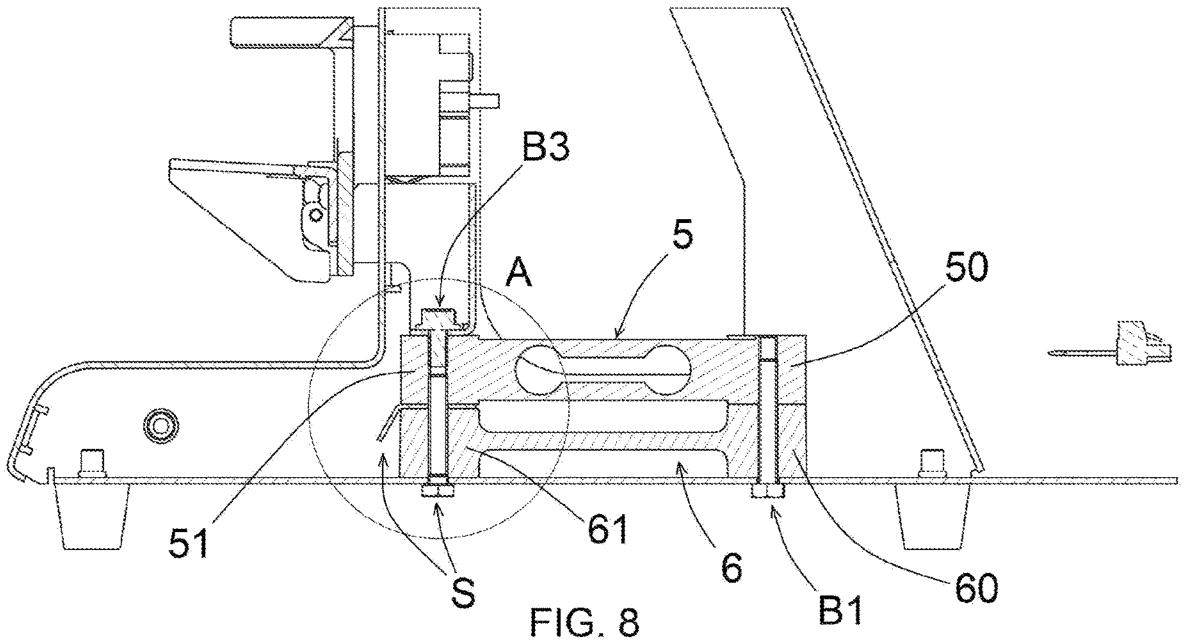
FIG. 8 is a sectional view taken along the plane VIII-VIII of FIG. 5.

With reference to FIGS. 6 and 8, third screw means (B3) secure the bracket (3) to the front portion (51) of the load cell.

As shown in FIG. 3, the bracket (3) has a fork with two arms (31) connected to the seat (30) that houses the filter holder (4). The arms (31) of the bracket are suitably mounted to slide vertically in slots (11) of the front partition (10) of the base. In such a way, when the ground coffee is fed into the filter (40) of the filter holder (4), the bracket (3) is lowered and the front portion (51) of the load cell is bent downwards, allowing for weighing.

Figure 7:
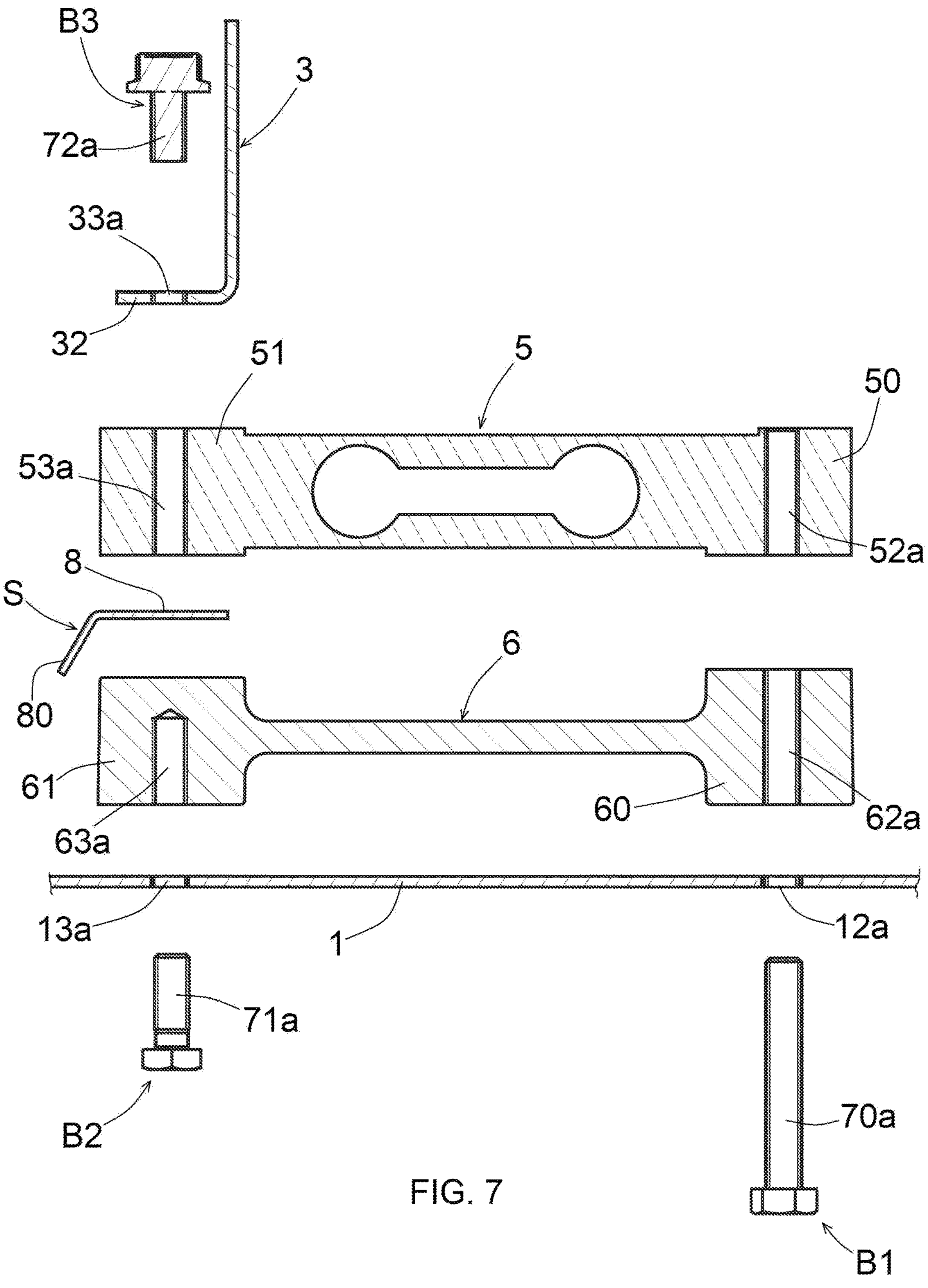
FIG. 7 is an exploded sectional view of some parts of FIG. 6.
Figure 9:
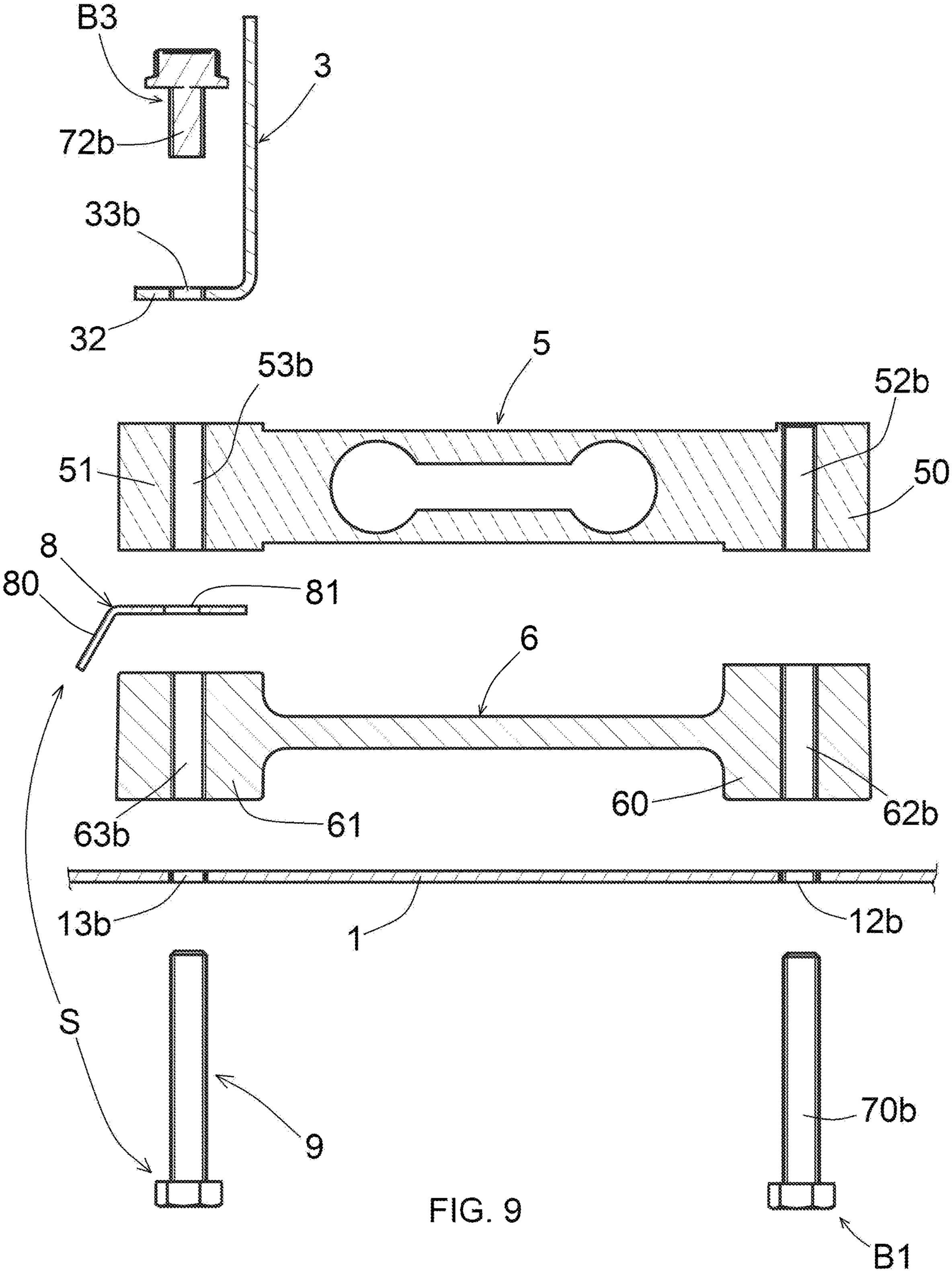
FIG. 9 is an exploded sectional view of some parts of FIG. 8.
Figure 10:
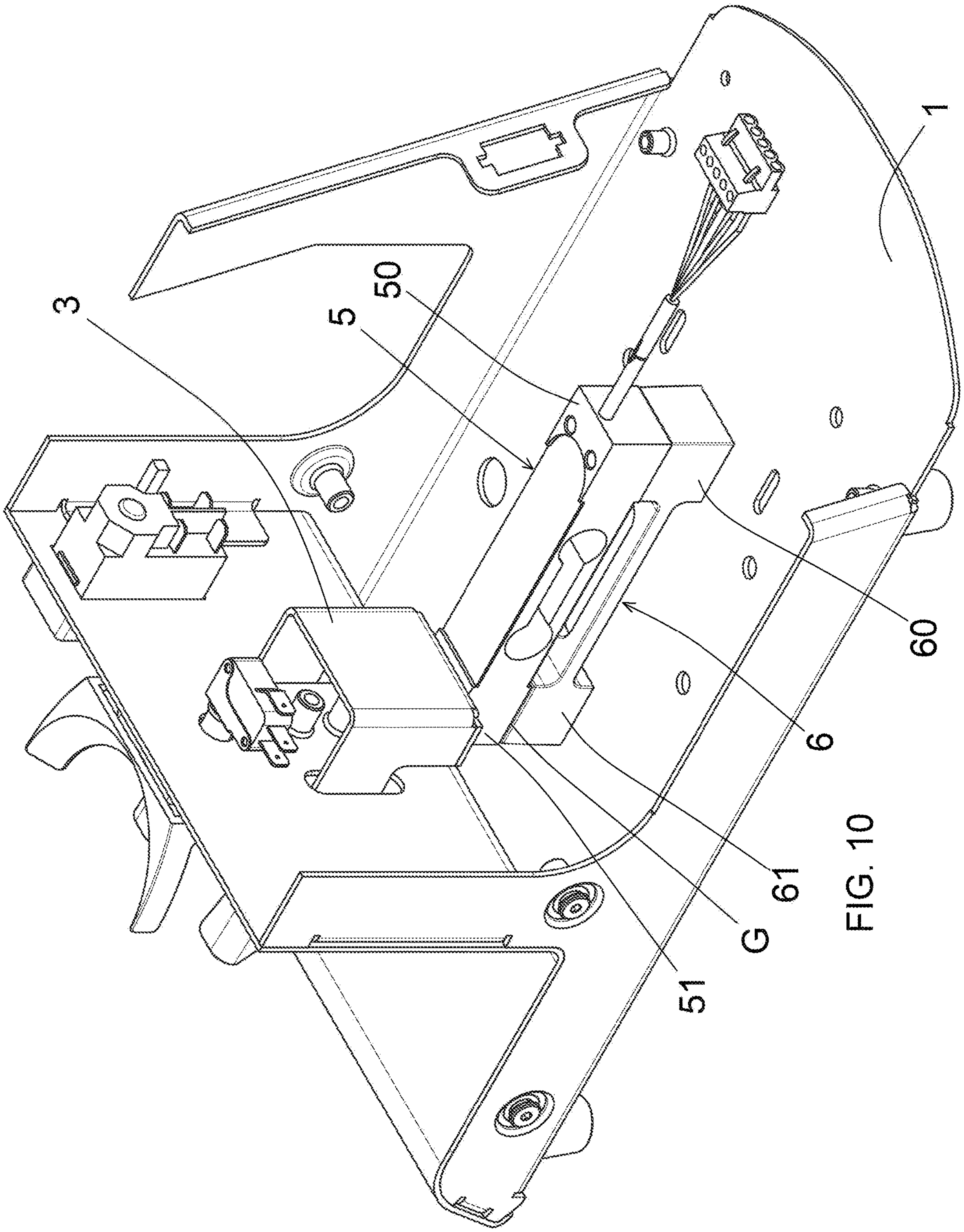
FIG. 10 is the same view as FIG. 3, except for it shows the load cell in operating configuration, ready for use.
Figure 11:
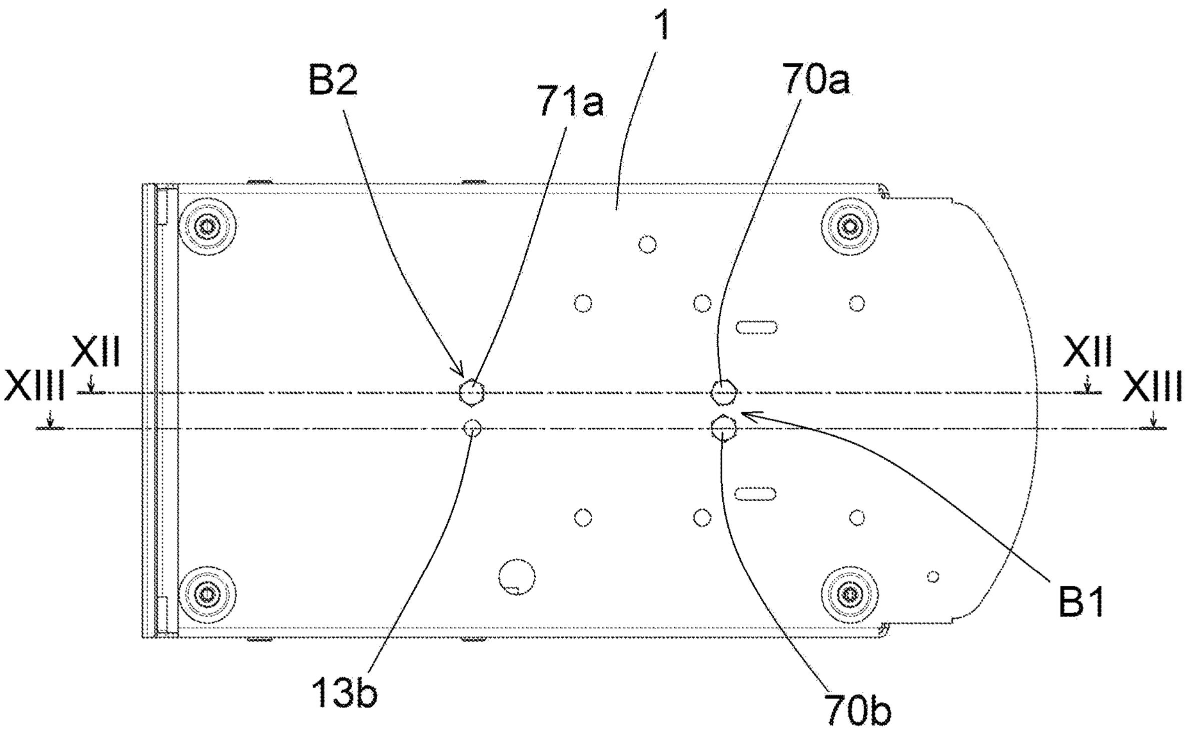
FIG. 11 is a bottom view of the base of FIG. 10.
Figure 12:
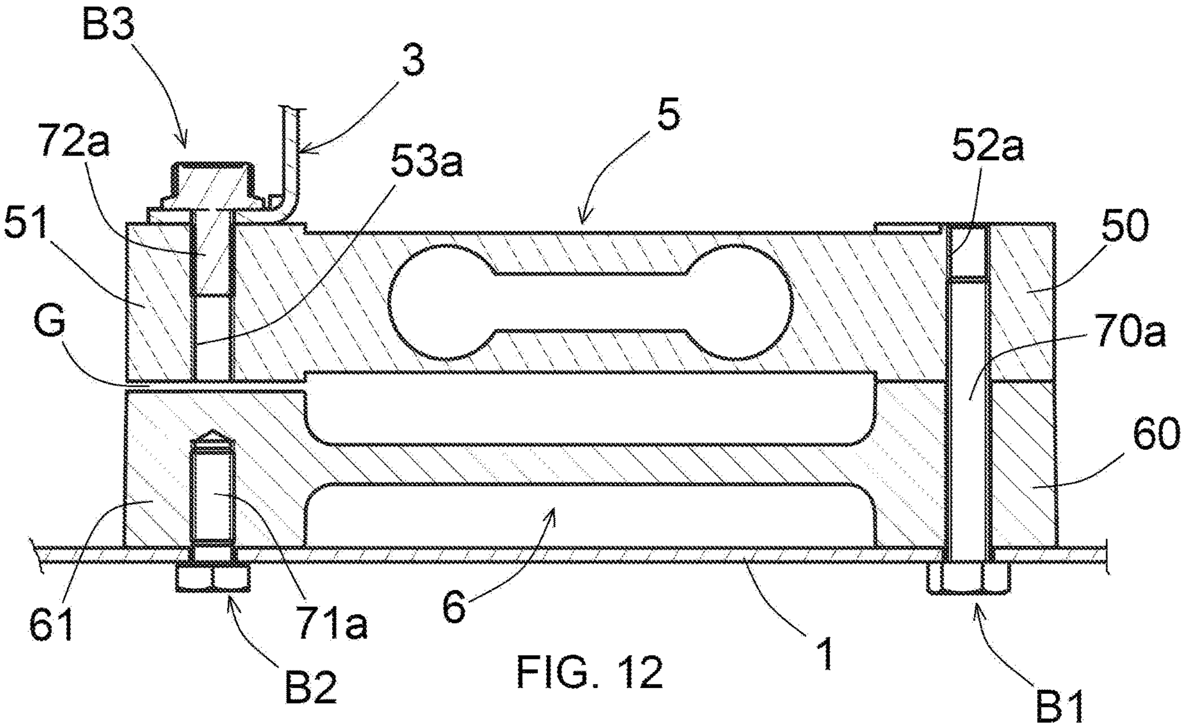
FIG. 12 is a sectional view taken along the plane XII-XII of FIG. 11.

With reference to FIGS. 7 and 9:

- the rear portion (60) of the support comprises a first through hole (62*a*) and a second through hole (62*b*), said holes possibly being threaded;
- the front portion (61) of the support comprises a first threaded hole (63*a*) that can be a blind hole or a through hole, and a second through hole (63*b*) that can be a threaded hole or an unthreaded hole as explained hereinafter;
- the rear portion (50) of the load cell comprises a first threaded hole (52*a*) and a second threaded hole (52*b*) that can be through holes or blind holes;
- the front portion (51) of the load cell comprises a first threaded hole (53*a*) can be a through hole or a blind hole and a second threaded through hole (53*b*) that must be a through hole;
- the base (1) has a pair of rear holes (12*a*, 12*b*) and a pair of front holes (13*a*, 13*b*);
- the bracket (3) has a horizontal shelf (32) with two holes (33*a*, 33*b*).

The first screw means (B1) comprise:

- a first rear screw (70*a*) that crosses the first hole (12*a*) of the pair of rear holes of the base and the first through hole (62*a*) of the rear portion (60) of the support and is screwed into the first threaded hole (52*a*) of the rear portion (50) of the load cell;
- a second rear screw (70*b*) that crosses the second hole (12*b*) of the pair of rear holes of the base and the second through hole (62*b*) of the rear portion (60) of the support and is screwed into the second threaded hole (52*b*) of the rear portion (50) of the load cell.

The second screw means (B2) comprise a front screw (71*a*) that crosses the first hole (13*a*) of the pair of front holes of the base and is screwed into the blind threaded hole (53*a*) of the front portion (61) of the support.

The third screw means (B3) comprise:

- a first upper screw (72*a*) that crosses the first hole (33*a*) of the pair of holes of the bracket and is screwed into the first threaded hole (53*a*) of the front portion (51) of the load cell;
- a second upper screw (72*b*) that crosses the second hole (33*b*) of the pair of holes of the bracket and is screwed into the second threaded through hole (53*b*) of the front portion (51) of the load cell.

It should be noted that the length of the shank of the second upper screw (72) is shorter than the length of the second threaded through hole (53*b*) of the front portion (51) of the load cell, so that a lower part of the thread of the second threaded through hole (53*b*) of the front portion (51) of the load cell remains free.

The coffee grinder (100) comprises a safety system(S) for locking the load cell (5) in position during the transportation of the coffee grinder, so as to prevent the front portion (51) of the load cell from bending due to accidental impacts on the seat (30) of the bracket.

The safety system(S) comprises a tab (8) having a thickness equal to the width of the gap (G) provided between the front portion (61) of the support and the front portion (51) of the load cell. The tab (8) is disposed in the gap (G) between the front portion (61) of the support and the front portion (51) of the load cell, so that the front portion (51) of the load cell is prevented from bending downwards.

The tab (8) has a protruding portion (80) projecting anteriorly from the gap (G) between the front portion (61) of the support and the front portion (51) of the load cell, so that it can be grasped by an operator.

The tab (8) has a hole (81) suitable for being disposed in register with the second through hole (63*b*) of the rear portion (61) of the support and the second threaded through hole (53*b*) of the front portion of the load cell.

Moreover, the safety system (S) comprises a safety screw (9) that crosses the second front hole (13*b*) of the base and the second through hole (63*b*) of the front portion of the support and is screwed into the second threaded through hole (53*b*) of the front portion (51) of the load cell.

In view of the above, the front portion (51) of the load cell is locked in position and is prevented from bending upwards due to an accidental upward thrust on the seat (30) of the bracket.

When the transportation of the coffee grinder (100) is completed, the safety screw (9) is unscrewed and removed. Then the tab (8) is extracted from the gap (G) between the front portion (61) of the support and the front portion (51) of the load cell. Now the coffee grinder (100) is ready to be used, as shown in FIGS. 10 to 13A.

Figure 8A:
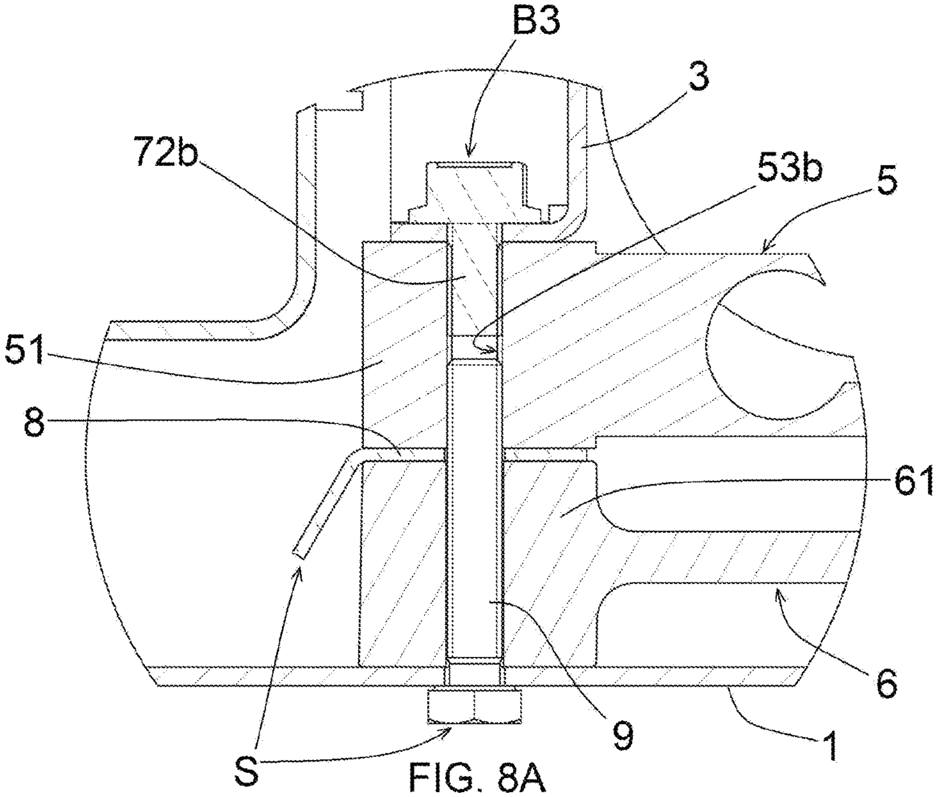
FIG. 8A is an enlarged detail enclosed in circle A of FIG. 8.
Figure 13:
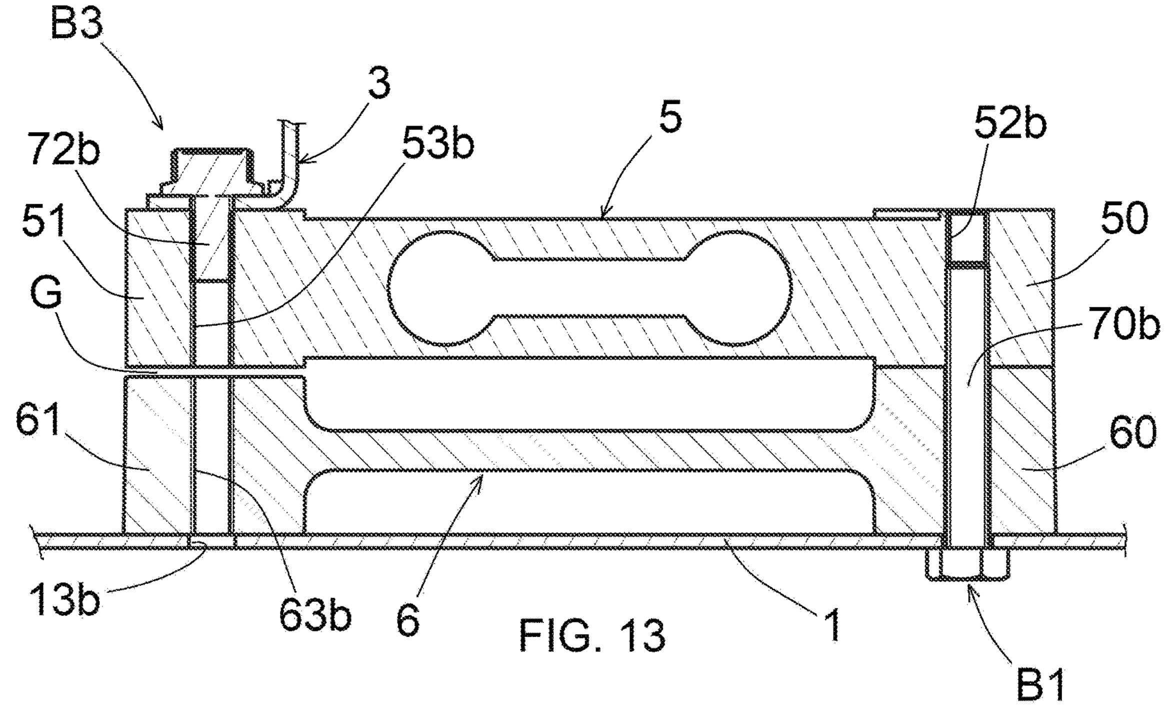
FIG. 13 is a sectional view taken along the plane XIII-XIII of FIG. 11.
Figure 13A:
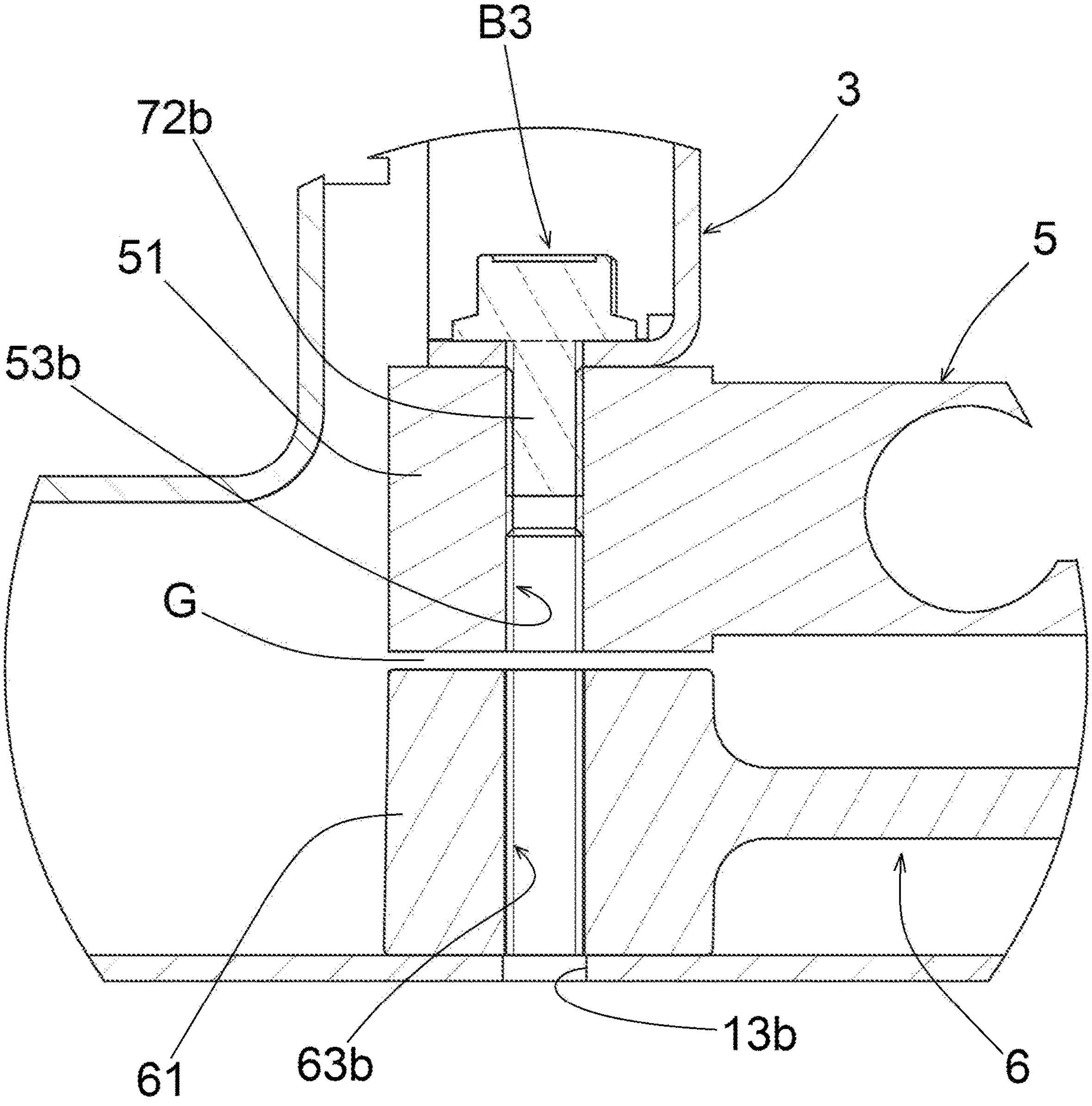
FIG. 13A is an enlarged detail of FIG. 13.

In particular, FIGS. 9 and 13A illustrate an embodiment of the support (6) wherein the second through hole (63*b*) of the front portion of the support is a threaded hole. In such a case, the safety screw (9) is screwed into the thread of the second through hole (63*b*) of the front portion of the support, as shown in FIG. 8A.

In such a case, the safety screw (9) is only used to lock the front portion (51) of the load cell during the transportation of the coffee grinder, and then the safety screw (9) is removed when the coffee grinder is used.

Figure 14:
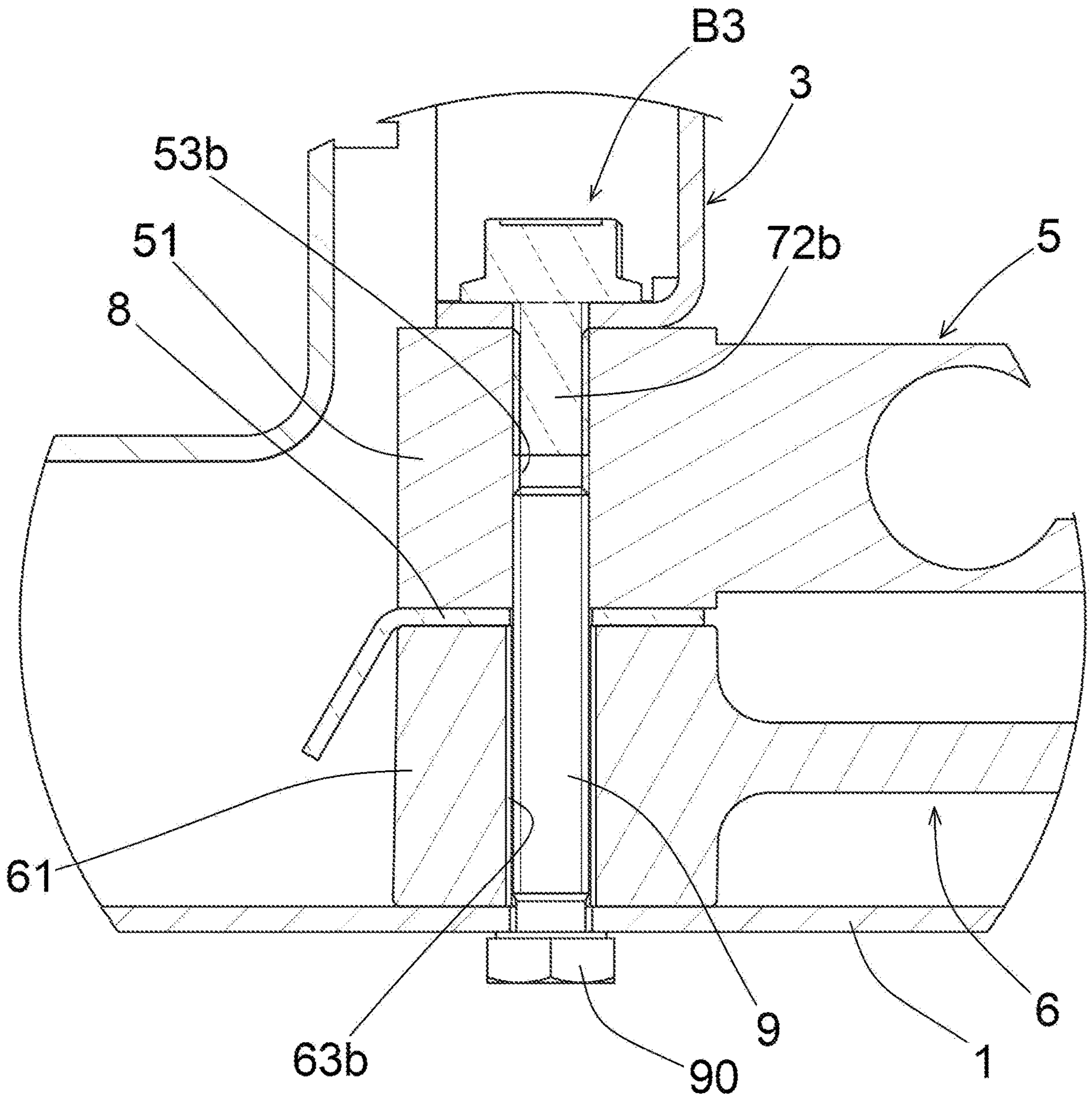
FIG. 14 is the same view as FIG. 8A, except for it shows a variant of the load cell support of the coffee grinder according to the invention, shown in a safety configuration during transportation.
Figure 14A:
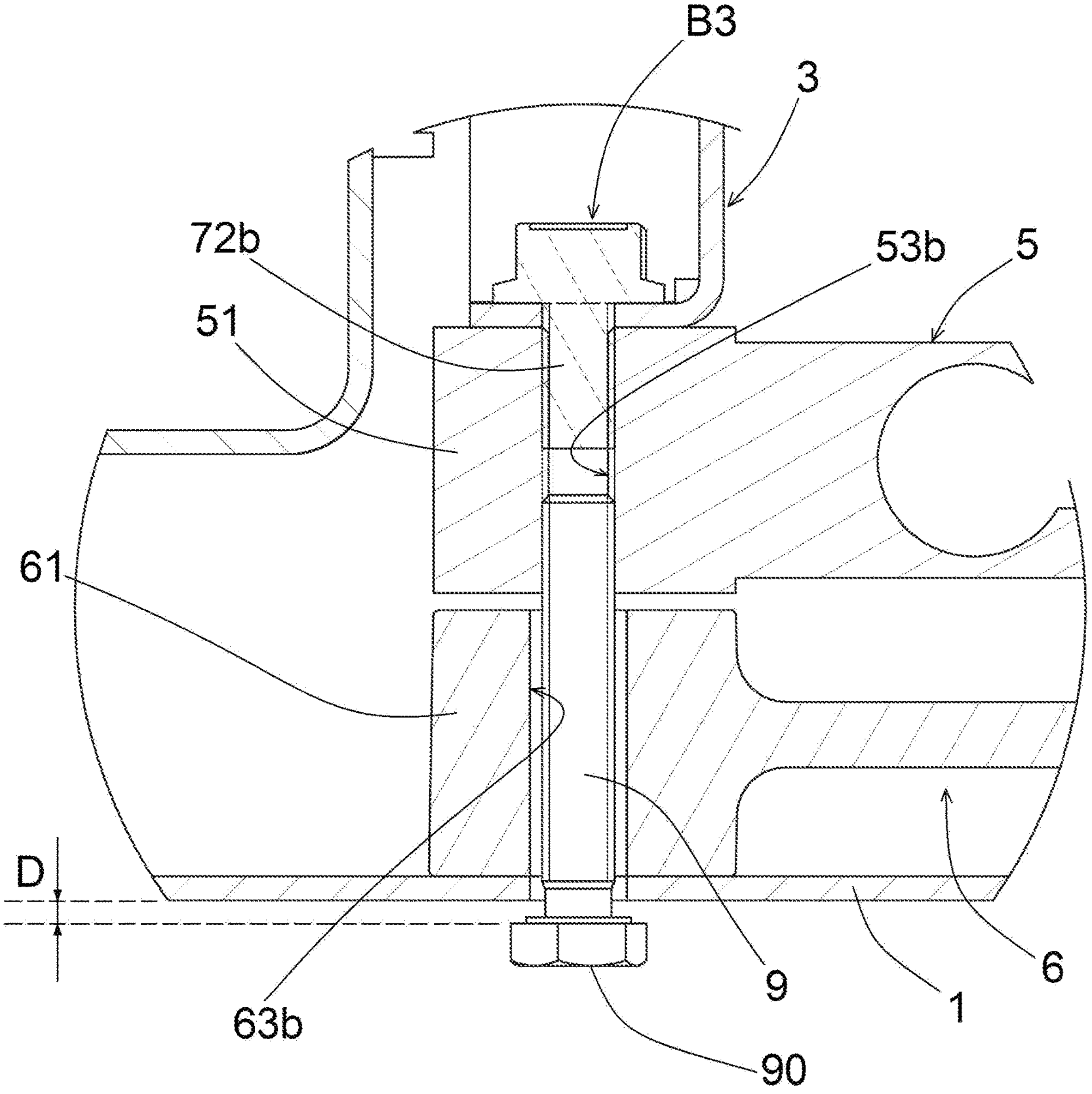
FIG. 14A is the same view as FIG. 14, except for it is shown in operating configuration during the operation of the coffee grinder, wherein the safety screw is used as stop to limit an upward travel of the front portion of the load cell.

With reference to FIGS. 14 and 14A, an embodiment of the support (6) is illustrated, wherein the second through hole (63*b*) of the front portion (61) of the support is not threaded, it being a hole having a larger diameter than the outer diameter of the shank of the safety screw (9), so that the safety screw (9) can slide into the second through hole (63*b*) of the front portion (61) of the support.

As shown in FIG. 14, during the transportation of the coffee grinder, the safety screw (9) is screwed into the second threaded through hole (53*b*) of the front portion (51) of the load cell, thus compressing the tab (8) between the front portion (61) of the support and the front portion (51) of the load cell in order to lock the front portion (51) of the load cell in position.

When the transportation of the grinder is completed, the safety screw (9) is unscrewed and removed, and the tab (8) is removed. Then, as shown in FIG. 14A, the safety screw (9) is screwed into the second threaded through hole (53*b*) of the front portion (51) of the load cell, until the head (90) of the safety screw is placed at a suitable distance (D) from the base (1) to prevent an excessive upward bending of the front portion (51) of the load cell that would damage the load cell. In such a way, being stopped against the base (1), the head (90) of the safety screw (9) acts as stop for an upward bending travel of the front portion (51) of the load cell.

Figure 15:
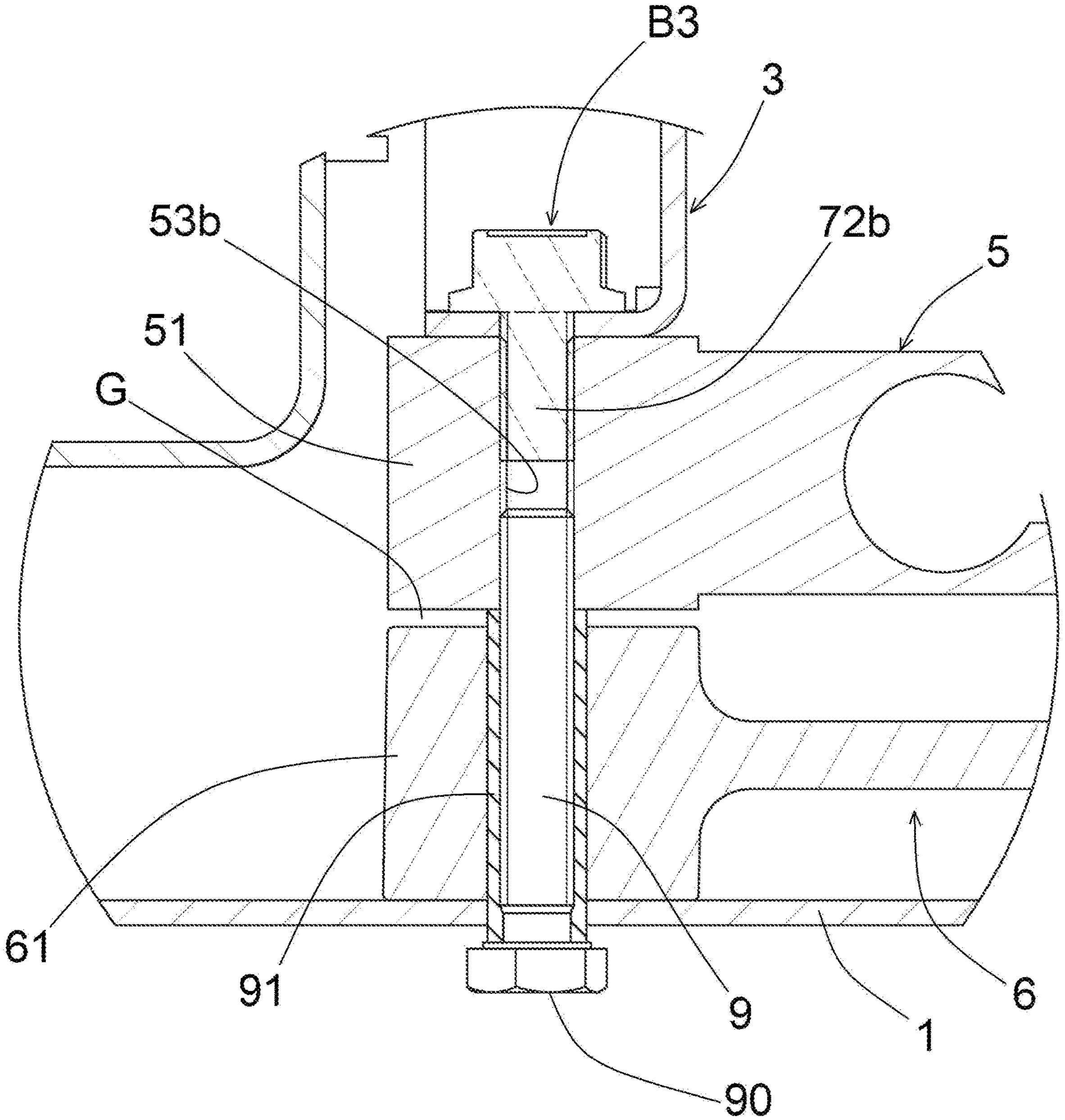
FIG. 15 is the same view as FIG. 14A, illustrating an improvement consisting of a bushing screwed onto the safety screw.

Referring to FIG. 15, advantageously, the safety screw (9) can be screwed into a bushing (91) with a smooth outer surface that is guided and slides on the inner surface of the second through hole (63*b*) of the front portion (61) of the support. The bushing (91) is disposed in a lower part of the shank of the safety screw (9) in such a way not to protrude superiorly from the front portion (61) of the support. The bushing (91) may be made of a material, such as polytetrafluoroethylene (PTFE), having a low friction coefficient with respect to the surface of the through hole (63*b*) of the front portion (61) of the support.

Equivalent variations and modifications may be made to the present embodiments of the invention, within the scope of a person skilled in the art, without departing from the scope of the invention as expressed by the appended claims.

The invention claimed is:

1. A coffee grinder apparatus comprising:

a base having a frame mounted thereon;

a grinding unit affixed to the frame;

an electric motor drivingly connected to said grinding unit;

a hopper opening into said grinding unit, said hopper adapted to feed coffee beans to said grinding unit;

a dispenser in communication with said grinding unit and adapted to dispense ground coffee;

a bracket movably mounted in a front partition arranged on said base, said bracket having a seat, the seat supporting a filter holder, the filter holder adapted to receive a filter under said dispenser such that the filter receives ground coffee;

a load cell connected to said bracket, said load cell adapted to measure a weight of the ground coffee in the filter of the filter holder, said load cell having a rear portion and a front portion fixed to said bracket; and a support fixed to said base, said support having a rear portion and a front portion, wherein the said cell is mounted on said support such that the rear portion of said load cell is securely fixed and the front portion of said load cell is spaced away from the front portion of said support so as to define a gap between the front portion of said support and the front portion of said load cell, wherein the gap has a width that permits a downward bending of the front portion of said load cell that is less than a maximum load limit of said load cell.

2. The coffee grinder apparatus of claim 1, wherein said load cell has a parallelepiped shape having a length dimension that is greater than a width dimension thereof, wherein said support has a length dimension equal to the length dimension of said load cell and a width dimension equal to the width dimension of said load cell.

3. The coffee grinder apparatus of claim 2, wherein said support is fixed to said base such that a longitudinal axis of said support is disposed at a centerline of said base, said support having the front portion adjacent to the front portion of said base.

4. The coffee grinder apparatus of claim 1, wherein said support has an H-shaped cross-section.

5. The coffee grinder apparatus of claim 1, further comprising:

a first screw securing the rear portion of said support to said base and the rear portion of said load cell to the rear portion of said support;

a second screw securing the front portion of said support to said base; and a third screw securing said bracket to the front portion of said load cell.

6. The coffee grinder apparatus of claim 5, wherein the rear portion of said support has a first through hole and a second through hole, the front portion of said support having a first threaded hole, the rear portion of said load cell having a first threaded hole and a second threaded hole, the front portion of said load cell having a first threaded hole and a second threaded through hole, said base having a first rear hole and a second rear hole and a first front hole, said bracket has a horizontal portion with a first hole and a second hole, wherein said first screw comprises:

a first rear screw that extends through the first rear hole of said base and the first through hole of the rear portion of said support, said first rear screw being screwed into the first threaded hole of the rear portion of said load cell; and a second rear screw that extends through the second rear hole of said base and the second through hole of the rear portion of said support, said second rear screw being screwed into the second threaded hole of the rear portion of said load cell, wherein said second rear screw comprises a front screw that extends through the first front hole of said base and is screwed into the first threaded hole of the front portion of said support, wherein the third screw comprises:

a first upper screw that extends through the first hole of said bracket and is screwed into the first threaded hole of the front portion of said load cell; and a second upper screw that extends through the second hole of said bracket and is screwed into the second threaded through hole of the front portion of said load cell, wherein a length of a shank of said second upper screw is less than a length of the second threaded through hole of the front portion of said load cell.

7. The coffee grinder apparatus of claim 6, further comprising:

a safety system that locks said load cell in a position so as to prevent the front portion of the said load cell from bending.

8. The coffee grinder apparatus of claim 7, wherein the front portion of said support has a second through hole, said base having a second front hole, said safety system having a safety screw that extends through the second hole of said base and said second through hole of the front portion of said support, the safety screw being screwed into said second threaded through hole of the front portion of said load cell.

9. The coffee grinder apparatus of claim 7, wherein the second through hole of the front portion of said support is a threaded hole into which the safety screw is screwed.

10. The coffee grinder apparatus of claim 7, wherein the second through hole of the front portion of the support is a non-threaded hole having a diameter greater than the outer diameter of said safety screw such so that said safety screw is slidable in the second through hole of the front portion of said support.

11. The coffee grinder apparatus of claim 10, further comprising:

a bushing screwed into said safety screw, said bushing being slidably mounted in the through hole of the front portion of said support.

12. The coffee grinder apparatus of claim 1, further comprising:

a safety system that locks said load cell in a position so as to prevent the front portion of the said load cell from bending.

13. The coffee grinder apparatus of claim 12, wherein said safety system has a tab, the tab having a thickness equal to the width dimension of the gap between the front portion of said support and the front portion of said load cell, the tab being positioned in the gap between the front portion of said support and the front portion of said load cell so as to prevent the front portion of said load cell from bending downwards.

14. The coffee grinder apparatus of claim 13, wherein the front portion of said support has a second through hole, said base having a second front hole, said safety system having a safety screw that extends through the second hole of said base and said second through hole of the front portion of said support, the safety screw being screwed into said second threaded through hole of the front portion of said load cell.

* * * * *